US006456478B1

(12) United States Patent
Kuhne

(10) Patent No.: US 6,456,478 B1
(45) Date of Patent: Sep. 24, 2002

(54) BROAD-BAND EMP SURGE DIVERTER

(75) Inventor: Gregor Kuhne, Herisau (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 09/402,795

(22) PCT Filed: Feb. 12, 1999

(86) PCT No.: PCT/CH99/00066

§ 371 (c)(1), (2), (4) Date: Oct. 12, 1999

(87) PCT Pub. No.: WO99/43052

PCT Pub. Date: Aug. 26, 1999

(30) Foreign Application Priority Data

Dec. 17, 1999 (SE) ............................................. 0378/98

(51) Int. Cl.[7] ................................................ H02H 1/00

(52) U.S. Cl. ...................... 361/117; 361/91.1; 361/113; 361/119; 361/120

(58) Field of Search ............................ 333/32–35, 263; 361/56, 91, 110, 111, 113, 115, 117, 119, 120, 127

(56) References Cited

U.S. PATENT DOCUMENTS

| | | | | |
|---|---|---|---|---|
| 2,438,913 A | * | 4/1948 | Hansen | 333/33 |
| 2,446,982 A | * | 8/1948 | Pound | 333/263 |
| 2,543,721 A | * | 2/1951 | Collard et al. | 333/263 |
| 5,978,199 A | * | 11/1999 | Germann et al. | 361/119 |

FOREIGN PATENT DOCUMENTS

| | | | |
|---|---|---|---|
| CH | 690146 A5 | 5/2000 | H01R/13/646 |
| EP | 855756 A1 | 1/1998 | H01P/1/202 |

* cited by examiner

*Primary Examiner*—Brian Sircus
*Assistant Examiner*—Robert L Deberadinis
(74) *Attorney, Agent, or Firm*—Jay H. Maioli

(57) ABSTRACT

A broad-band EMP surge diverter in a coaxial line with a waveguide (20) placed in an outer conductor (10) and electrically connected via a short-circuit link (24) to the inner conductor (30) of the coaxial line, whereby sections of conductor (31, 32, 33, 34, 35) of corresponding wave impedance in the coaxial line give rise to a frequency band of substantial band width.

8 Claims, 2 Drawing Sheets

BROAD-BAND EMP SURGE DIVERTER

BACKGROUND OF THE INVENTION

1. Field of the Invention

The present invention relates to a broad-band EMP surge arrester in a coaxial line consisting of a casing mounted in the outer conductor and a λ/4 (or periods thereof) short-circuit line joined in an electrically conductive manner to the inner conductor of the coaxial line, with the end of this short-circuit line making contact with the casing.

2. Description of Related Art

Electromagnetic pulses of the artificial type, such as may be generated by motors, switches, cycled power supply units or the like, as well as those of natural sources, such as those caused by direct or indirect lightning flashes, are conducted by a process of inductive, capacitive or conductive coupling via coaxial lines into the connected equipment, and can damage or even completely destroy them. It is already known how to protect equipment at their input against severe overvoltages, interference voltages or lightning current by means of diverting or reflecting systems. Known examples of such systems are EMP gas arresters, also called EMP charge eliminators, which may be used to divert or reflect these damaging currents, voltages and specific frequencies. Such arrangements are disclosed in Swiss patent CH-660261 and Swiss patent applications 914/95, 158/87.

The protective circuits known to us have various disadvantages. The natural capacity of gas discharge protectors limited their broad-band use to less than 36 Hz, and the known λ/4 short circuits or periods thereof exhibit band-widths of up to 20% at most (band-width/mean frequency). This rules out broad-band protection circuits, e.g. for entire waveguide bands or their use in the dual band GSM/PCN (Global System for Mobile Communication/Personal Communication Network).

OBJECTS AND SUMMARY OF THE INVENTION

The object of the invention is to create a broad-band EMP arrester that allows the transmission of a frequency band of a wider bandwidth for example for dual band applications or complete waveguide bands without adversely affecting this frequency band and which reflects or diverts harmful frequencies to earth.

This object is achieved by the invention defined in the claims.

The broad-band EMP surge arrester is a surge arrester, that is used between the casing and an electrically lengthened λ/4 (or periods thereof) short-circuit line whereby line sections of differing wave impedance arranged in the main conductor make it possible for the frequency band to encompass bandwidths via bandpass transformations of up to an octave in one instance and more than an octave in other instances. The impedance of the main conductor is varied with the corresponding sections. The differences are produced by controlling the parameters of diameter, length and/or surrounding dielectrics of the section of conductor.

BRIEF DESCRIPTION OF THE DRAWINGS

Preferred embodiments of the invention are explained below, by way of example, where.

DETAILED DESCRIPTION OF PREFERRED EMBODIMENTS

Figure 1:
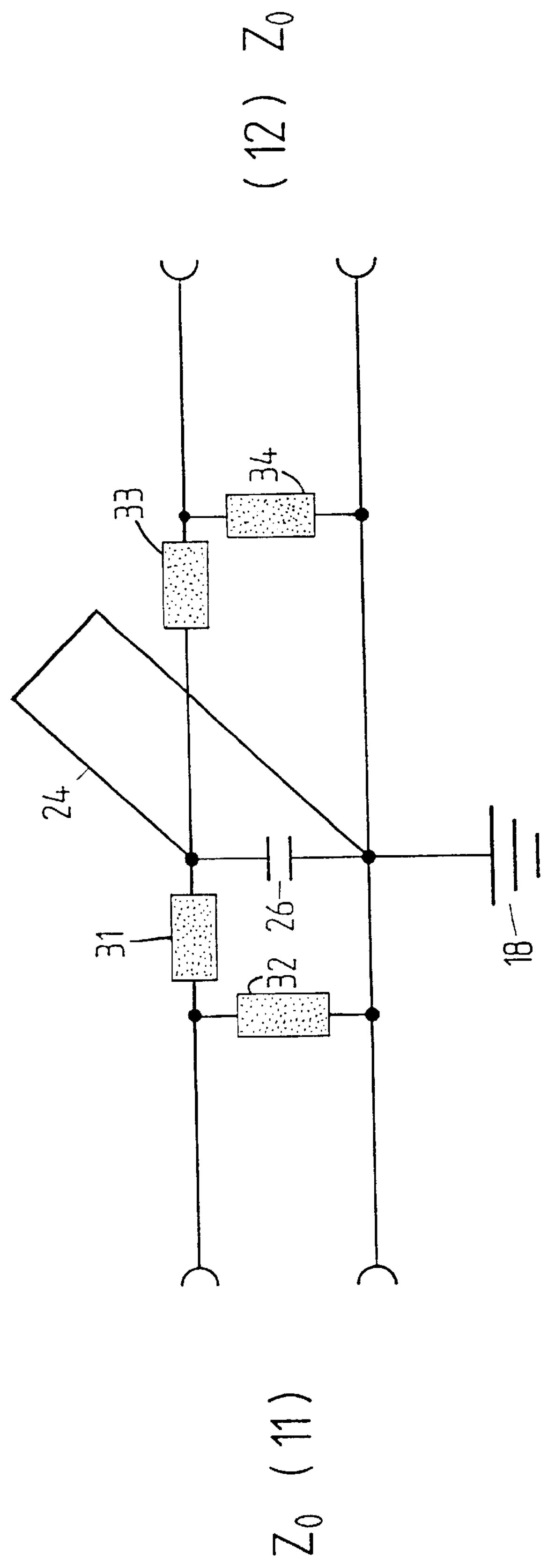
FIG. 1 shows an electrical block diagram of a preferred embodiment of a broad-band EMP surge arrester with line sections of appropriate characteristic wave impedance in the main conductor.
Figure 2:
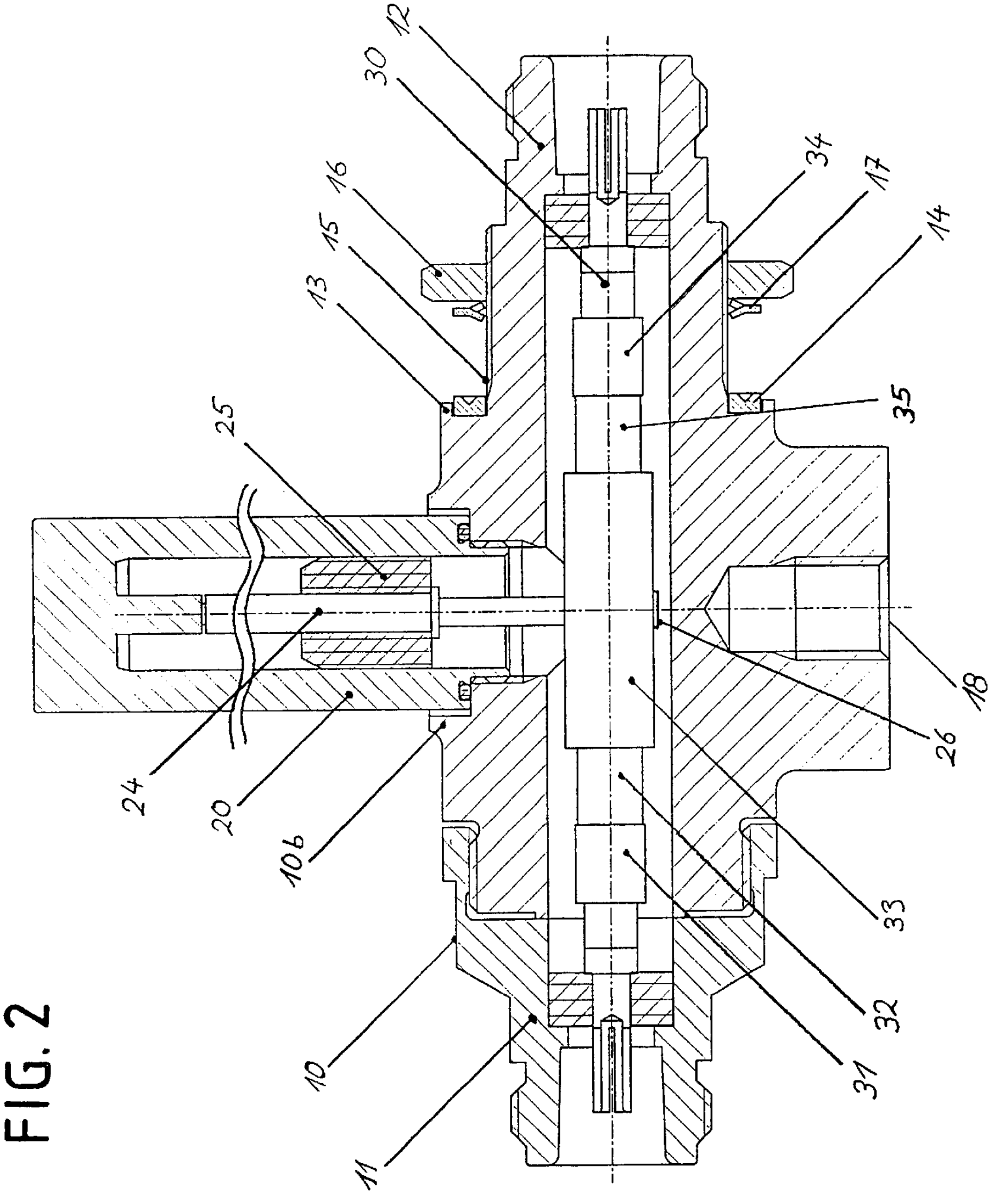
FIG. 2 shows an exemplary sectional view through one part of a preferred embodiment of a broad-band EMP surge arrester as shown in FIG. 1.

The broad-band EMP surge arrester shown in the block diagram in FIG. 1 and shown in sectional view in FIG. 2 in the form of a plug-in coupling consists of an outer conductor 10, that has a cylindrical casing with connectors 11 and 12 arranged on either side for coaxial lines to be screwed or plugged into them. In the context of this design, connector 11 on the left-hand side of the drawing is intended to serve as the coupler in the unprotected area, for example connecting to an antenna, and connector 12 on the right-hand side of the drawing is intended to serve as the protected connection to an electronic appliance. In the embodiments presented here, it is intended that this EMP surge arrester be fastened to a screw connection or a duct passing through the casing as an earth connection. To this end, the outer conductor 10 features a screw connection 18 or a flange 13 and a thread 15, which together with a washer 17 or similar and a nut 16 make up a screw fastening to a wall of the casing. An additional seal 14 made of refined soft copper provides a low-resistance and low-inductance contact. To the expert with knowledge of the present invention, there are in principle other fastening options available in accordance with other assembly standards.

An external waveguide in the form of a 20 is screwed into or mounted on a central part **10*b* of the outer conductor 10. This outer waveguide 20 is electrically connected to the inner conductor 30 via the short-circuit line 24. The length of the short-circuit line 24** is matched to the electrically lengthened λ/4 wavelength (or periods thereof) of the medium frequency band to be transmitted.

The mechanical length of short-circuit line 24 can be electrically shortened by mounting dielectrics 25 in the region of short-circuit line 24. For this reason, the hollow cylinder 20 and conductor 24 are shown broken in FIG. 2. The length of short-circuit line 24 can also be mechanically shortened by mounting one or more lumped capacitances or reactances constituted, for example, by one or several end plates 26 acting as capacitive elements.

The bandwidth of the frequency band to be transmitted can be determined by means of conductor sections 31, 32, 33, 34, 35 of suitable characteristic impedances arranged in the coaxial line. The impedance of the main conductor is varied in the regions of conductor sections 31,32,33,34,35. This is achieved by different line sections. These sections 31, 32, 33, 34, 35 differ by the parameters of diameter, length and/or the surrounding dielectrics. The bandwidth of the frequency band to be transmitted can be adjusted by bandpass transformation by means of these conductor sections 31, 32, 33, 34 and their wave impedance values up to an octave in one instance and in excess of an octave in another instance, so that due to its bandpass characteristic, as well as the short circuit line 24, different types of terminal units can be protected against harmful interference and EMP effects.

What is claimed is:

1. A broad-band EMP surge arrester in a coaxial line with a waveguide mounted in an outer conductor that is electrically connected to an inner conductor of the coaxial line by a λ/4 short-circuit line, the surge arrester comprising predetermined line sections of the inner conductor which have relatively different characteristic wave impedances and by their combined arrangement have a bandpass characteristic and via bandpass transformation determine a bandwidth of a frequency band to be transmitted.

2. The EMP surge arrester as per claim 1, further comprising means for adjusting the bandwidth of the frequency band to be transmitted to one of up to an octave and in excess of an octave.

3. The EMP surge arrester as per claim 1 or 2, wherein a length of the short-circuit line is adjusted to a middle of the electrically lengthened λ/4 wavelength, of the frequency band to be transmitted, wherein the short-circuit line is mechanically shorter than the λ/4 wavelength and is electrically lengthened to the λ/4 wavelength.

4. The EMP surge arrester as per claim 3, further comprising dielectrics arranged within a region of the short-circuit line provided for bringing about an electrical lengthening of the λ/4 wavelength and periods thereof.

5. the EMP surge arrester as per claim 3, wherein an internal diameter of the waveguide is matched to the bandwidth of the frequency band to be transmitted.

6. The EMP surge arrester as per claim 3 further comprising capacitive elements arranged within a region of short-circuit line to form one of concentrated capacitors and capacitive reactors and to electrically lengthen the λ/4 wavelength and periods thereof.

7. The EMP surge diverter as per any one of claims 1, 2, 4, 5, or 6, wherein by using the line sections of different characteristic wave impedance, the bandwidth of the frequency band to be transmitted is adjustable via a bandpass transformation to one of up to an octave and more than an octave.

8. The EMP surge arrester as per claim 3 wherein by using the line sections of different characteristic wave impedance, the bandwidth of the frequency band to be transmitted is adjustable via bandpass transformation to one of up to an octave and more than an octave.

* * * * *